A. H. FOX.
PUNCHING MACHINE.
APPLICATION FILED FEB. 24, 1919.

1,334,364.

Patented Mar. 23, 1920.

Inventors:
A. H. Fox

By Chas. N. Butler
Attorney

UNITED STATES PATENT OFFICE.

ADAM H. FOX, OF WISSAHICKON, PENNSYLVANIA, ASSIGNOR TO STANDARD CAR CONSTRUCTION COMPANY, OF SHARON, PENNSYLVANIA, A CORPORATION OF DELAWARE.

PUNCHING-MACHINE.

1,334,364.  Specification of Letters Patent.  Patented Mar. 23, 1920.

Application filed February 24, 1919. Serial No. 278,567.

*To all whom it may concern:*

Be it known that I, ADAM H. Fox, a citizen of the United States, and resident of Wissahickon, in the county of Philadelphia and State of Pennsylvania, have invented certain Improvements in Punching-Machines, of which the following is a specification.

This invention is an improved machine designed primarily for punching holes in the flanges of tank heads, but it will be understood that it is not limited to such use and that it is adapted for general use.

The leading object of the invention is to provide a simple and efficient machine that will hold, automatically turn intermittently through predetermined spaces and punch when held stationary, a curved body.

The characteristic features of my improvements are fully disclosed in the machine shown in the accompanying drawings and in the following description thereof.

Figure 1:
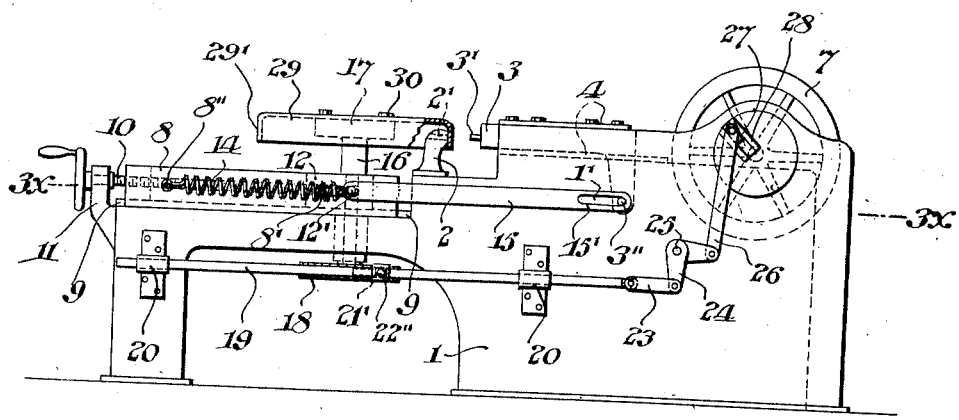
Figure 2:
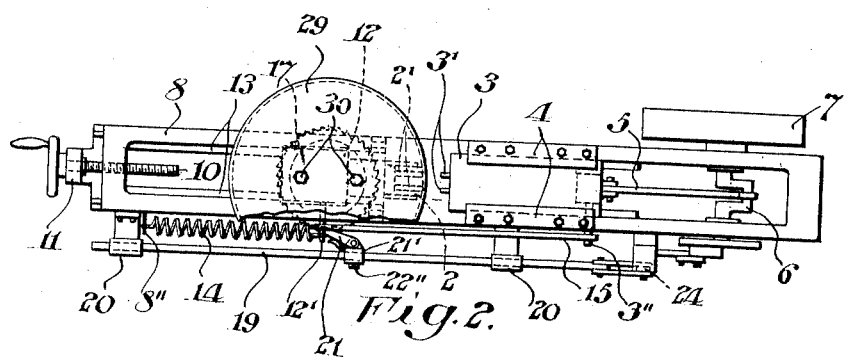
Figure 3:
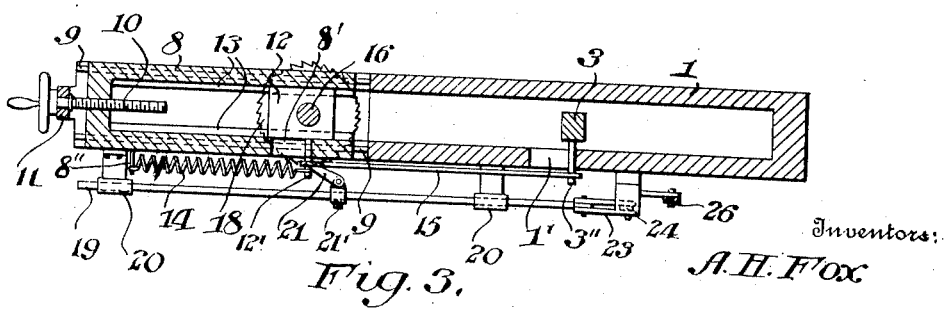

In the drawings, Figure 1 is a broken side elevation of the machine; Fig. 2 is a broken plan view of the same, and Fig. 3 is a sectional view on the line 3×—3× of Fig. 1.

The improvements, in the form thereof illustrated, comprise a bed 1 provided with the anvil 2 containing the holes 2'. A reciprocatory block or plunger 3, provided with the punches 3' adapted to enter the holes 2', is movable in the ways 4 of the bed by a pitman 5, the latter being connected with and operated by a crank shaft 6 having a driving and fly wheel 7 fixed thereon.

A slide 8 is movable on ways 9 of the bed 1, to and from the anvil 2, by means of a screw 10, the latter being swiveled in the bearing 11 on the bed and feeding through the adjacent end of the slide.

A block 12 is movable on ways 13 carried by the slide 8 and is provided with a stud 12' which extends through and acts in a slot 8' in the slide, whereby the movement of such block relatively to the slide is limited, the block being drawn back in the slide by a spring 14 connected with the stud 12' and with a stud 8" on the slide.

A rod 15 connects the stud 12' with a stud 3" on the block 3, the stud 3" acting in the slot 1' in the bed and in the slot 15' in the rod.

An arbor 16, journaled in the block 12, has fixed thereon a head or turn table 17 and a ratchet wheel 18. A reciprocatory rod 19, movable in bearings 20 fixed to the bed, carries a spring pressed pawl 21 adapted to engage and turn the ratchet wheel 18, the pawl being carried by a collar 21' adjustable on the rod and fixed thereto by a set screw 22".

The rod 19 is reciprocated and turns the head 17 intermittently, through the intermediate mechanism, in synchronous relation to the movements of the block 3 through the intermediate mechanism comprising the link 23 pivotally connected to the rod, the crank lever 24 fulcrumed on the bearing 25 and connecting the link 23 with a link 26, and the crank block 27 which moves in and connects the link 26 with the grooved crank arm 28 on the crank shaft 6.

A tank head 29 is fixed centrally on the table 17 over the anvil 2, in any suitable manner, as by the bolts 30, and the flange 29' on the head is pressed against the anvil by the spring 14 acting through the parts 12', 12, 16, 17 and 30, the slide 8 having been adjusted by the screw 10 to obtain the proper relation.

The head 29 having been positioned and its flange 29' pressed against the anvil 2 by the spring 14, the machine is started, when the crank shaft 6 acts through the pitman 5 to advance the block 3 and force the punches 3' through the flange 29' as it is supported by the anvil 2, the crank shaft simultaneously retracting the rod 19 together with the pawl 21 through the parts 28, 27, 26, 24 and 23. The punches having performed their operation, the block 3 is retracted by the further movement of the crank shaft 6 and acts through its stud 3", the rod 15 and the stud 12' on the block 12 to free the flange 29' from its engagement with the anvil 2, and simultaneously therewith the rod 19 is advanced, whereby the pawl 21 is caused to advance the wheel 18 a step, turning the head 29, through an equal arc to position for the succeeding operation of the punches. The further movement of the crank shaft to again advance the punch block and operate the punches, releases the spring which again presses the flange against the anvil where it is held as before during the punching operation.

Having described my invention I claim:—

1. In a punching machine, the combination of reciprocatory punching mechanism, an anvil, rotary mechanism for carrying the article to be punched, and means whereby said rotary mechanism is adapted to be automatically reciprocated to move said article to and from said anvil.

2. In a punching machine, the combination of reciprocatory punching mechanism, an anvil, rotary mechanism for carrying the article to be punched, means whereby said punching mechanism is reciprocated and said rotary mechanism is turned intermittently in synchronous relation, and means whereby said rotary mechanism is adapted to be reciprocated to move said article to and from said anvil.

3. In a punching machine, supporting means provided with approximately parallel ways, a block provided with punching means adapted to reciprocate along a way aforesaid, a bearing member adapted to reciprocate along a way aforesaid, an arbor provided with means for supporting an article to be punched, said arbor journaled in said member transversely to the direction of movement of said block, an anvil carried by said supporting means, means for moving said member to and from said anvil, means for reciprocating said block, and means for turning said arbor step by step in synchronous relation to the movements of said block.

4. In a punching machine, supporting means provided with approximately parallel ways, an anvil carried by said means, a bearing member adapted to reciprocate along a way aforesaid, an arbor journaled in said member transversely to its direction of movement, means carried by said arbor for carrying an article to be punched relatively to said anvil, punching mechanism adapted to reciprocate along a way aforesaid, a crank shaft journaled in said supporting means, means whereby said crank shaft reciprocates said punching means, means whereby said crank shaft turns said arbor step by step between the punching operations, and means whereby said bearing member is moved to hold said article against said anvil during the punching operation and to hold it away from said anvil during the turning operations.

5. In a punching machine, supporting means provided with an anvil and ways, a bearing member movable along a way aforesaid to and from said anvil, a punching member movable along a way aforesaid to and from said anvil, an arbor journaled in said bearing member transversely to its way, means carried by said arbor for holding and moving an article to be punched relatively to said anvil, a crank shaft journaled in said supporting means, means whereby said crank shaft reciprocates said punching member, means whereby said crank shaft turns said arbor intermittently in synchronous relation to the movements of said punching member, and means whereby said crank shaft moves said bearing member in synchronous relation to the movements of said arbor and punching member.

6. In a punching machine, supporting means provided with an anvil and ways, a bearing member movable along a way aforesaid to and from said anvil, a punching member movable along a way aforesaid to and from said anvil, means comprising an arbor journaled in said bearing member transversely to its way for holding and revolving an article to be punched in relation to said anvil, means connecting said bearing member and punching member whereby they are movable together along said ways to withdraw said article from said anvil upon the reverse movement of said punching member, and means for reciprocating said punching member and turning said arbor intermittently in synchronous relation.

7. In a punching machine, supporting means provided with an anvil and ways, a bearing member movable along a way aforesaid to and from said anvil, an arbor journaled in said member, means carried by said arbor for carrying a curved article relatively to said anvil, a spring acting on said member to press said article against said anvil, a punching member movable along a way aforesaid for coacting with said anvil in punching said article, means comprising a rod connecting said members for withdrawing said article from said anvil upon the retraction of said punching block, and means for reciprocating said punching member and turning said arbor intermittently in synchronous relation so that said arbor is operated during the retraction of said punching member.

8. In a punching machine, a bed provided with ways, a slide adjustable along a way aforesaid, a bearing member adapted to reciprocate in said slide, an arbor journaled in said member, means carried by said arbor for holding an article to be punched, an anvil carried by said bed for supporting said article during the punching operation, a punching member adapted to reciprocate in a way aforesaid, means for reciprocating said punching member and turning said arbor intermittently in synchronous relation, and means for reciprocating said bearing member to press said article against said anvil during the punching operation and to withdraw said article from said anvil during the turning operation alternately with said punching operation.

In testimony whereof I have hereunto set my name this 21st day of February, 1919.

ADAM H. FOX.